Oct. 29, 1957   O. G. SHORT   2,811,113
RAILWAY MOTOR TRUCK STRUCTURE
Original Filed Oct. 19, 1951

Inventor
Oliver G. Short
By Rodney Bedell
atty.

United States Patent Office 2,811,113
Patented Oct. 29, 1957

2,811,113

RAILWAY MOTOR TRUCK STRUCTURE

Oliver G. Short, Granite City, Ill., assignor to General Steel Castings Corporation, Granite City, Ill., a corporation of Delaware Continuation of application Serial No. 252,127, October 19, 1951. This application October 7, 1955, Serial No. 539,159

4 Claims. (Cl. 105—132.1)

This application is a continuation of an earlier application filed October 19, 1951, Serial No. 252,127, now abandoned.

The invention relates to railway motor trucks of the type in which driving motors are supported from the truck frame between the axles and are operatively connected to the wheel and axle assemblies by gearing mounted in housings carried on the axles but anchored to the truck frame to resist orque fotrces tending to rotate the housings about the axle.

It has been customary in such trucks to anchor the gear housings to the transverse transoms of the truck frame at points on the transoms intermediate the sides of the truck. The transoms are made heavier than would be required otherwise in order to adequately resist the torque thrusts in addition to he other loads carried by th transoms.

The main object of the present invention is to free the truck frame transverse transoms of the torque thrusts and to increase the clearance near the transverse center line of the truck for additional equipment, such as shock absorbers controlling the action of the load-carrying bolster relative to the truck frame.

This object is attained by anchoring the motor gearing torque arm to the truck side member at points on the latter spaced from the transverse transoms. The invention is particularly advantageous when embodied in an inside bearing four-wheel truck in which the truck side members are supported from journal bearings positioned inwardly of the truck wheels and the side members are of truss type with deep center portions for supporting the truck bolster and with shallow end portions resting on the bearings.

An additional object of the present invention is to support the torque thrust from the deepened center portions of the side members, thereby rendering it unnecessary to make the frame sections heavier because of the torque thrust and better avoiding moments applied to the side frame in a plane extending transversely of the truck, as would be likely to attend the anchoring of the torque arms on shallow frame members.

Another object of the present invention is to simplify the connection between torque arms of the type described and the truck frame by eliminating hangers and the necessity of machining bearings for the hangers on the truck frame and on the torque arms.

These and other detail objects are attained by the structure illustrated in the accompanying drawings, in which.

Figure 1:
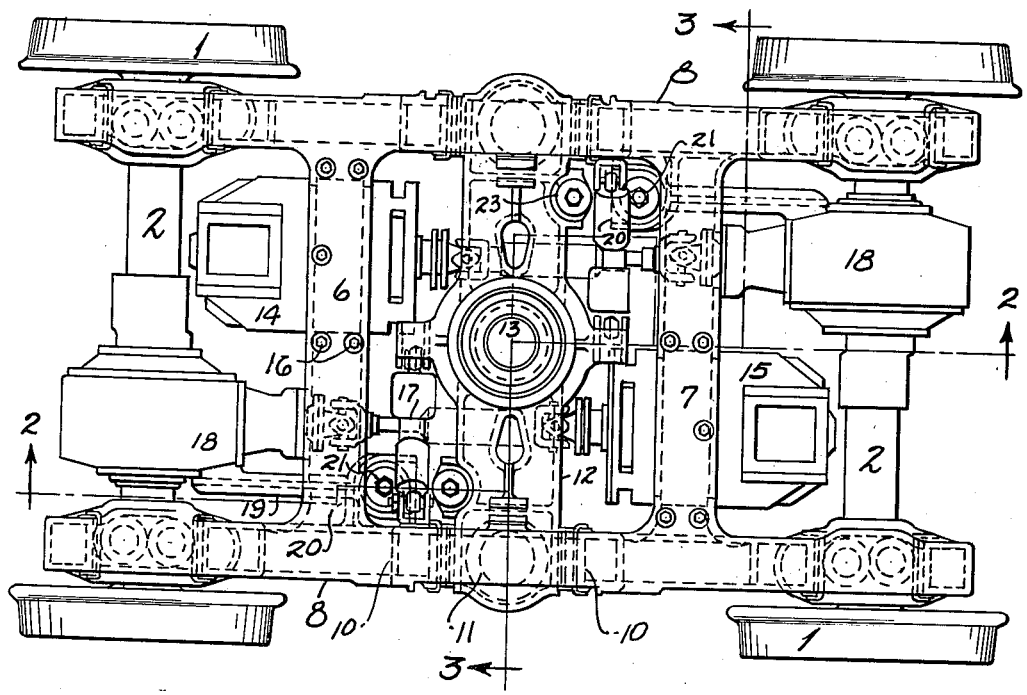
Figure 1 is a top view of four wheel railway motor truck.
Figure 2:
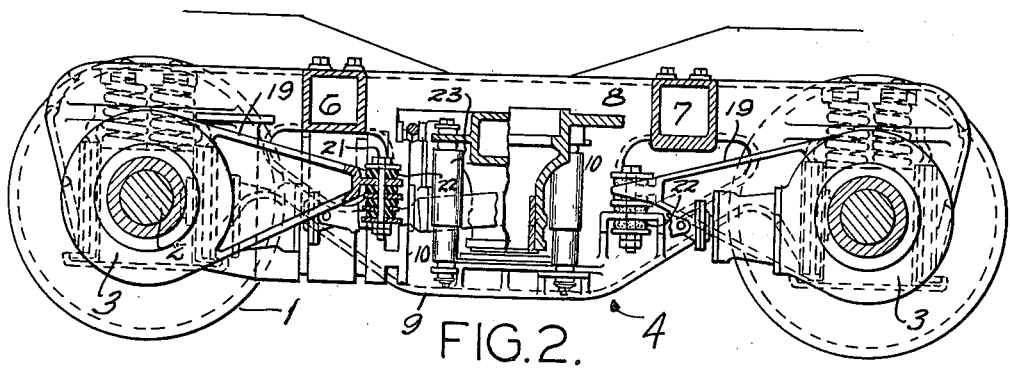
Figure 2 is in part a side elevation and in part a longitudinal vertical section taken on the line 2—2 of Figure 1.
Figure 3:
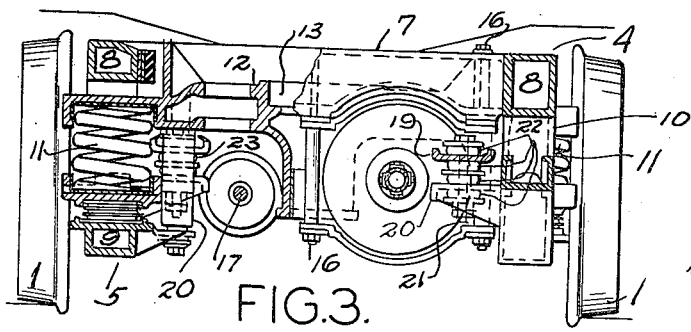
Figure 3 is a vertical transverse section taken on the line 3—3 of Figure 1, with a portion of the drive shaft broken away.

The truck includes two assemblies of wheels 1 and axles 2 having bearings inside the wheels for mounting the journal boxes 3. The truck frame includes side members 4 and 5 spring-mounted on journal boxes 3, and spaced transverse transoms 6 and 7, preferably formed integrally with side members 4 and 5, as, for example, in a one piece casting. Each side member 4 and 5 is in the form of a truss with an upper chord 8, a lower chord 9, and upright columns 10, cooperating to form windows in the side frame for receiving the bolster supporting springs 11 and the ends of the bolster 12 which includes a center plate 13 upon which the vehicle body (not shown) may be mounted.

Motors 14 and 15 are suspended from transoms 6 and 7 respectively by bolts 16 and each motor has an individual drive shaft 17 connected to a set of gears mounted on the more remote axle and enclosed in a housing 18 having a torque arm 19 extending towards the bolster and beneath the adjacent transom.

Each side frame has a bracket 20 extending inwardly from and preferably formed integrally with one of the columns 10. The inner end of each torque arm 19 overlies one of the brackets 20 and is anchored to the bracket by a bolt 21, there being rubber pads 22 between the bracket and the torque arm and between each end of the bolt and the bracket and torque arm to yieldingly transmit the torque thrusts.

Each bracket 20 extends inwardly from the side member column a short distance only and is spaced substantially from the corresponding motor drive shaft 17 and avoids interference with the bolts and straps by which the other motor is suspended from the transom.

The above described structure attains the objects stated in the introductory portion of the specification and provides ample clearance for the motor suspensions, the motor drive shafts and additional equipment, such as the shock absorbers indicated at 23 and 24.

In the event of failure of a torque arm anchor bolt 21, the arm will be limited in its movement by the corresponding bracket 20 and the overlying transoms 6, 7. Twisting moments on the truck frame transom are eliminated and the application and removal of the gear housing to and from the truck is facilitated.

The details of the structure may be varied without departing from the spirit of the invention and the exclusive use of those modifications coming within the scope of the claims is contemplated.

What is claimed is:

1. In a railway truck, wheel and axle assemblies, a truck frame spring-supported thereon and including side members, motors mounted on the truck frame, a housing journaled on each axle, gears carried by each housing and associated with the corresponding axle, a drive shaft operatively connecting the corresponding motor and gears, a torque arm on the housing extending away from the corresponding axle lengthwise of the truck and adjacent to one of said side members, a bracket on the side member, said bracket and an end portion of the torque arm spaced from the axle being in overlapping relation and having opposed horizontal surfaces, a rubber pad between said surfaces, and an upright bolt passing through the rubber pad and the opposed portions of the bracket and torque arm and clamping them together, the rubber pads being distortable to accommodate limited vertical movement of the clamped end of the torque arm relative to the frame and to yieldingly resist oscillatory movements of the gear housing about its axle resulting from the action of the frame supporting spring.

2. A railway truck according to claim 1 in which the bracket on the truck frame side member underlies the clamped end portion of the torque arm, and the truck frame includes a transom extending from side member to side member above the end of the torque arm, whereby the bracket and transom limit rotary movement of the torque arm irrespective of the bolt.

3. In a railway truck, wheel and axle assemblies, a truck frame spring-mounted thereon, motors mounted on the truck frame and movable vertically therewith relative to said assemblies, gears mounted on the assemblies, drive shafts operatively connecting the motors and gears, gear housings with torque arms and movable vertically with said assemblies, and brackets on the truck frame side members provided with vertically yielding pads of rubber-like material supporting the outer ends of the torque arms, said brackets underlying the end portions of the torque arms, the truck frame including transoms extending from side member to side member above the ends of the torque arms, whereby the brackets and transoms positively limit rotary movement of the torque arms.

4. In a railway truck, spaced wheel and axle assemblies, a truck frame mounted thereon and including upper and lower side members and upright columns spaced apart lengthwise of the truck and forming a bolster window, transoms extending between said side members intermediate the columns and said assemblies, motors supported from said transoms and each having a driving connection including gearing to the assembly at the opposite end of the truck, a housing for the gearing connection to each assembly provided with a torque arm extending towards the middle of the truck, a bracket on the adjacent side frame extending inwardly from the corresponding column, and individual means anchoring the ends of the torque arms to the corresponding brackets.

References Cited in the file of this patent

UNITED STATES PATENTS

| | | |
|---|---|---|
| 1,831,714 | Latshaw | Nov. 10, 1931 |
| 2,023,756 | Brownyer | Dec. 10, 1935 |
| 2,084,891 | Cease | June 22, 1937 |
| 2,460,211 | Barrows et al. | Jan. 25, 1949 |